(No Model.) 2 Sheets—Sheet 2.
C. D. JENNEY.
DYNAMO ELECTRIC MACHINE OR MOTOR.
No. 474,388. Patented May 10, 1892.
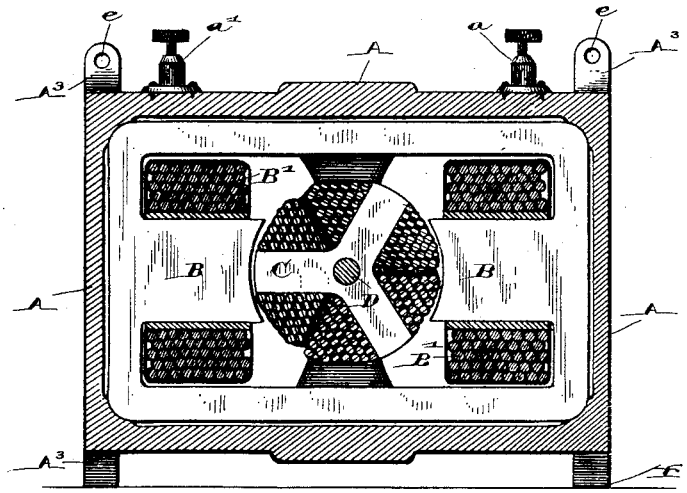
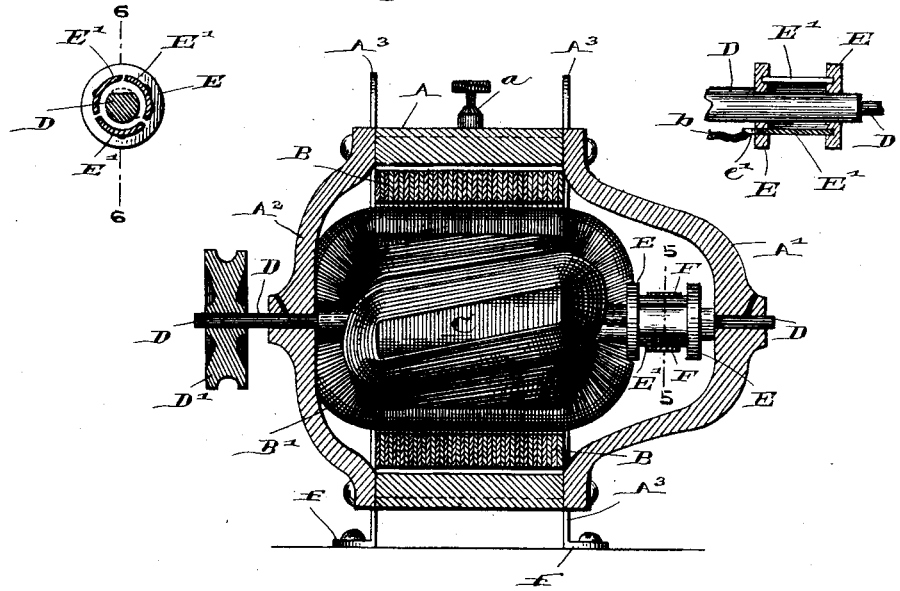
WITNESSES:
INVENTOR
Charles D. Jenney,
BY
␣Bradford.
ATTORNEYS.

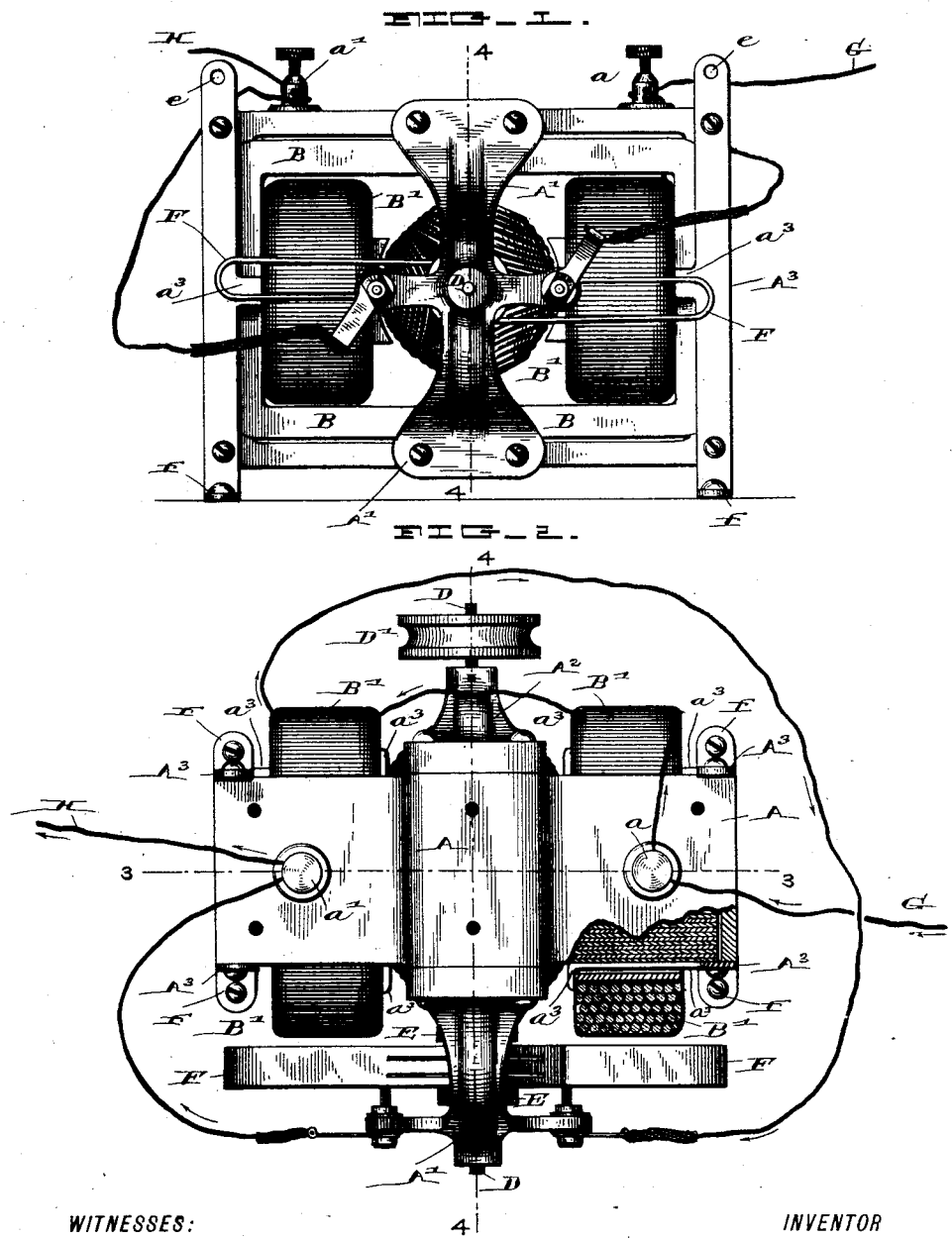

UNITED STATES PATENT OFFICE.

CHARLES D. JENNEY, OF INDIANAPOLIS, INDIANA, ASSIGNOR TO THE JENNEY ELECTRIC MOTOR COMPANY, OF SAME PLACE.

DYNAMO-ELECTRIC MACHINE OR MOTOR.

SPECIFICATION forming part of Letters Patent No. 474,388, dated May 10, 1892.

Application filed January 8, 1891. Serial No. 377,110. (No model.)

*To all whom it may concern:*

Be it known that I, CHARLES D. JENNEY, a citizen of the United States, residing at Indianapolis, in the county of Marion and State of Indiana, have invented certain new and useful Improvements in Dynamo-Electric Machines or Motors, of which the following is a specification.

The object of my said invention is to produce an efficient and inexpensive dynamo-electric machine or motor.

Said invention will be first fully described, and then pointed out in the claims.

Referring to the accompanying drawings, which are made a part hereof and on which similar letters of reference indicate similar parts, Figure 1 is a side elevation of a dynamo or motor embodying my said invention; Fig. 2, a top or plan view of the same, including a diagrammatic representation of the electrical connections; Fig. 3, a longitudinal vertical sectional view on the dotted line 3 3 in Fig. 2; Fig. 4, a transverse vertical sectional view looking toward the right from the dotted line 4 4 in Fig. 1; Fig. 5, a detail sectional view of the commutator on the dotted line 5 5 in Fig 4, and Fig. 6 a detail longitudinal view of said commutator on the dotted line 6 6 in Fig. 5.

In the drawings, the portions marked A represent the cast or otherwise integrally-formed inclosing frame; B, a series of plates of sheet metal forming the magnetic frame; C, a series of plates of sheet metal forming the core of the armature; D, the armature-shaft; E, the heads of the commutator; F, the commutator-brushes; G, the incoming line-wire, and H the the outgoing line-wire. The frame A is a solid integral frame, composed, preferably, of cast metal. Its interior surface is so formed as not to come in contact with the plates of which the field-magnet is composed, except at the corners, as shown most plainly in Fig. 3, and therefore it only needs to be finished at said corners in order that said plates of the magnetic frame may fit and be held accurately to position. Preferably this fitting is done by running a boring-tool of the proper size down at each of said corners, through a jig laid over the casting, and the plates being of course stamped to exact size no other fitting is usually required. Upon this frame are secured the brackets or cross-bars $A'$ $A^2$, in which are the bearings for the shaft D. Upon it at convenient points are also commonly secured binding-posts $a$ $a'$.

As shown most plainly in Fig. 3, the magnetic frame is composed of a series of plates B, the exterior outline of which is preferably substantially rectangular with preferably rounded corners and the interior outline of which is parallel with the exterior outline, except that from two opposite sides portions extend inwardly which approach the armature and form cores for the field-magnet coils and are the magnetic poles for the armature. These plates, as will be observed, are stamped each in a single piece, and when laid into the frame A form, with the spools or coils of wire $B'$ placed thereon, complete field-magnets without further fitting. They are held in place by bars $A^3$, which are commonly screwed or bolted to the frame A and the edges of which overlap the ends of the outside ones of these plates, thus holding the plates in place. Said bars $A^3$ also extend down somewhat and form feet $f$ for the machine, and at the upper end they extend up and include eyes $e$ by which the machine may be suspended from above, so as to be conveniently swung about when required, as in dental or other similar work. An arm $a^3$ may extend in from each of these bars $A^3$, alongside the cores of the field-magnets under the coils $B'$ and the inner ends be turned up against the inner sides of said coils, thus holding them securely upon said cores. This is illustrated in Fig. 2, one corner being broken and sectioned for that purpose. The coils $B'$ are usually wound separately on thin sheet-metal spools and afterward inserted into the machine and slipped over the cores. Afterward the points of the arms $a^3$ are bent up, which secures them in place, as before described.

The plates C, from which the cores of the armatures are formed, are stamped out of sheet metal similarly as the plates for forming the field-magnets are stamped. In this type of machine I have found a "three-legged" armature to be desirable, and the plates are therefore stamped with three parts projecting equally from a common center, as shown most plainly in Fig. 3. When these plates are mounted on the shaft, they are "staggered" or set around a little successively, so that when the armature is completed they are in the position shown in Fig. 4. This prolongs the time that the armature and field-magnets are in operative relation and appreciably improves the result. Each "leg" is wound with wire, as shown, and as will be readily understood.

The shaft D is an ordinary armature-shaft and carries the armature, the commutator, and a driving-wheel D', as is common.

The commutator is composed of two disks or hubs E, which have annular grooves in their sides which face each other, and curved plates E', the ends of which are set in said grooves, as shown particularly in Figs. 5 and 6, which plates correspond in number to the legs or sections of the armature. At a point about central to each of the sections of the commutator a hole is drilled through that head thereof next the armature, and said sections are each provided with a projecting portion $e'$, which extends through said hole and is connected to a wire $b$, which connects it to its section of the armature, as shown most plainly in Figs. 4 and 6. This is a very inexpensive method of forming the commutator, and such a commutator is quite good enough for a machine of this type, as I have demonstrated by practical tests. The commutator brushes F are mounted on arms extending out from the bracket or cross-bar A', and, as well as the connections thereto, are of a simple and easily understood construction.

The incoming and outgoing line-wires G and H are of course only shown for purposes of illustration. They, as well as the connections, will be fully understood by an examination of Fig. 2 of the drawings.

Having thus fully described my said invention, what I claim as new, and desire to secure by Letters Patent, is—

1. The combination, in a dynamo-electric machine or motor, of an integral frame-work surrounding the field-magnet and fitted at determinate points to evenly support the plates of which said field-magnet is composed, and said field-magnet composed of plates of sheet metal stamped out in the desired form and fitted within said integral frame, substantially as shown and described.

2. The combination, in a dynamo-electric machine or motor, of a surrounding frame fitted at determinate points to receive and support the field-magnet, said field-magnet and bars secured to said frame and forming both means of holding the field-magnet within the frame and feet therefor, substantially as shown and described.

3. The combination, in a dynamo-electric machine or motor, of a commutator composed of two hubs or disks of insulating material mounted on a shaft provided with grooves in their sides which face each other and holes extending through that disk nearest the armature, commutator-sections corresponding in number to the sections of the armature mounted in said grooves, projections on said commutator-sections extending through said holes and connected with wires from the sections of the armature and said armature, said several parts being constructed, arranged, and operated substantially as shown and described.

In witness whereof I have hereunto set my hand and seal at Indianapolis, Indiana, this 5th day of January, A. D. 1891.

CHAS. D. JENNEY. [L. S.]

Witnesses:
CHESTER BRADFORD,
FRANK W. WOOD.